US006716903B1

(12) United States Patent
Baumeister

(10) Patent No.: US 6,716,903 B1
(45) Date of Patent: Apr. 6, 2004

(54) COATING COMPOSITION FOR THE MANUFACTURE OF PRINTABLE COATED PAPER AND BOARD, COMPONENT OF THE COATING COMPOSITION AND PROCESS FOR THE MANUFACTURE OF PAPER AND BOARD

(75) Inventor: Manfred Baumeister, Bobingen (DE)

(73) Assignee: CTP Papierhilfsmittel GmbH & Co. (DE)

( * ) Notice: Subject to any disclaimer, the term of this patent is extended or adjusted under 35 U.S.C. 154(b) by 463 days.

(21) Appl. No.: 09/630,164

(22) Filed: Aug. 1, 2000

(30) Foreign Application Priority Data

Aug. 3, 1999 (DE) .......................................... 199 36 476

(51) Int. Cl.$^7$ ........................... C08K 3/26; C08L 51/00; C08H 1/00
(52) U.S. Cl. ..................... 524/425; 524/504; 523/205; 527/201
(58) Field of Search ........................... 524/425, 21, 22, 524/25, 504; 523/205; 527/201

(56) References Cited

U.S. PATENT DOCUMENTS

| 4,154,899 A | * | 5/1979 | Hershey et al. |
| 4,495,029 A | * | 1/1985 | Bergmann et al. |
| 5,260,396 A | * | 11/1993 | Kroner et al. |
| 5,275,846 A | * | 1/1994 | Imai et al. |
| 5,302,501 A | * | 4/1994 | Tamura et al. |

FOREIGN PATENT DOCUMENTS

DE    195 29 661 C1    4/1997

OTHER PUBLICATIONS

Baumeister et al., Einsats eiones innovativen Meβverfaherns bei der Entwicklung neuartiger Streichfarbenadditive, *Wochenblatt für Papierfabrikation* 16, 1023–1031 (1999).

* cited by examiner

Primary Examiner—Tae H. Yoon
(74) Attorney, Agent, or Firm—Connolly Bove Lodge & Hutz LLP

(57) ABSTRACT

A coating mix for the production of coated paper and board is described in form of an aqueous dispersion with a solids content of 50 to 80% consisting of pigments, binders, and additives. The coating mix exhibits thixotropic flow characteristics and is characterized by the usage of special amine-group or amide-group containing polymers, which act as protective colloids for the pigment particles. The coating mix contains preferably between 0.1 to 1 weight percent of a grafted gelatin.

9 Claims, 1 Drawing Sheet

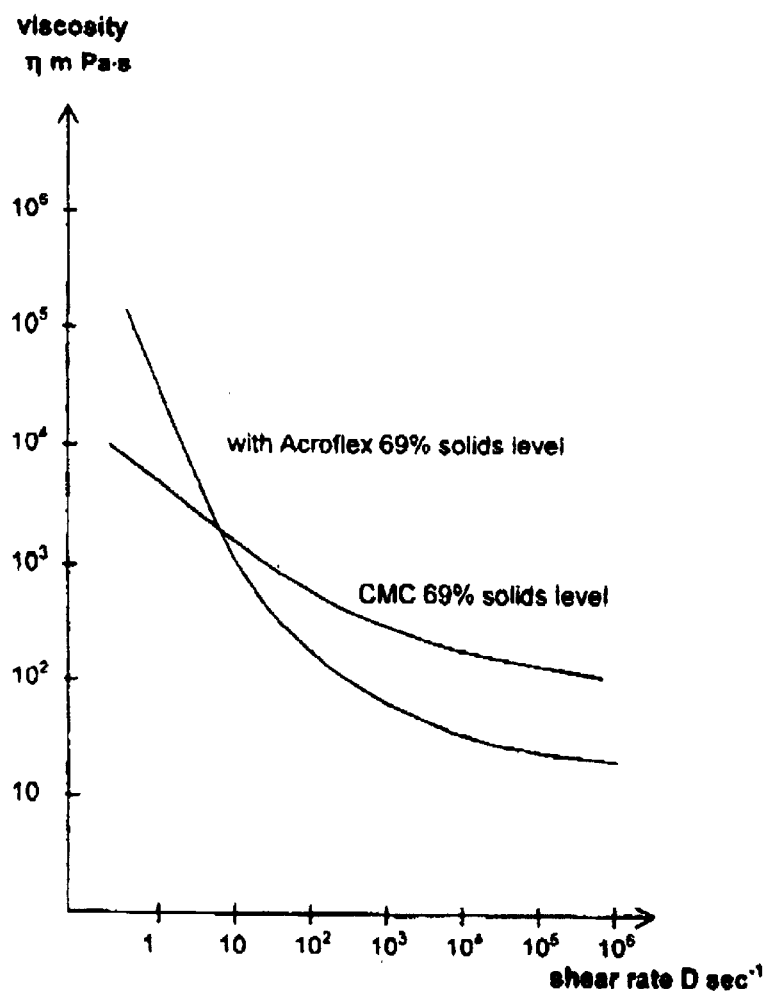
Fig.
The viscosity of the Acroflex formulation is highly shear rate dependent. At very high shear rates, up to $10^6$ sec$^{-1}$ viscosity of the Acroflex formulation is lower in comparison to the CMC formulation.

COATING COMPOSITION FOR THE MANUFACTURE OF PRINTABLE COATED PAPER AND BOARD, COMPONENT OF THE COATING COMPOSITION AND PROCESS FOR THE MANUFACTURE OF PAPER AND BOARD

DESCRIPTION

Coating composition for the manufacture of printable coated paper and board, component of the coating composition and process for the manufacture of paper and board.

The present application deals with a coating formulation for the manufacture of coated paper and board, and a selected polymeric component for the production of coating colours, including a manufacturing process for paper and board.

Paper and board are composed of individual fibers, which cause a surface roughness related to the dimensions of the fiber components. Surface roughness adversely effects printability of paper and boards. In order to reduce this surface roughness, paper and board are coated with coating colours containing pigments like coating clay, fine and ultrafine ground limestone, dispersants, converted starch polymeric binder emulsions and other additives. The coating colour can be applied in several process stages, for instance as pre and topcoat.

Ideally application of the coating mix results in complete and homogeneous coverage of the raw stock surface and with no penetration into raw stock pores. The coating colour can be applied to a web running at speeds up to 1800 m/min with a roll applicator the surplus of applied colour is metered off with a blade. Drying of the coated web is effected with available and known technologies.

The process can be integrated into the paper production process or can be carried out as a separate production stage. The viscosity and runnability of coating colours depend largely on the solids level of the mix. A high solids level can reduce drying energy consumption, however high viscosities can cause problems, like high hydraulic flow resistance in pipes, poor colour distribution in the applicator pond and excessively high blade pressure. These problems can lead to reduced production speed.

A low solids level of the coating colour results in excessive wettening of the raw stock and hence a dramatic reduction of raw stock strength and an increased number of web breaks. Also drying energy consumption increases significantly. The coating colour should also exhibit viscosity stability over extended time periods.

High solids content in conjunction with suitable and stable viscosities are sought to be achieved with dispersants and other additives. Also dispersants derived from natural raw materials are used widely. An especially effective natural dispersant is carboxymethylcellulose.

For coating formulations containing UFGL (ultrafine ground limestone) as the major pigment, the use of gelatine for this application has been described for instance in patent DE-C-195 29 661. Also dispersants on a fully synthetic basis, such as polyvinylpyrrolidone are described in the same patent.

The present invention provides a coating formulation, which allows to obtain a coated product with improved quality parameters like brightness and gloss and a further improvement of runnability, e.g. avoidance of bleeding and streaking at the blade and loss wetting of the raw stock web.

The coating mix of this invention is particulary suitable for the application of UFGL, which because of its high brightness and wide spread availability gains steadily more importance compared to kaolin. However, the high percentage of fines in UFGL can cause runnability problems.

For make up of a coating composition pigments or pigment mixtures, soluble and/or dispersed binder polymers are thoroughly mixed. Soluble polymers can cause volume exclusion or depletion flocculation of dispersion and emulsion particles. As a result wet packing characteristics of the coating colour can deteriorate. Also blending of pigment slurries with different optimal dispersant requirement can cause formation of pigment aglomerates due to over or underdispersion of a specific pigment fraction. As a result water release from such coating formulations into the web during the application stage is much higher.

It was now found, that in contrast to the generally used electrostatic stabilization, steric stabilization provides high viscosity stability, both over extended time periods at constant solids and in relation to solids variations occurring as a result of the coating process.

Steric stabilization functions by formation of a polymer layer around the particle. According to Huggins and Flory, the polymer should show a high interaction potential with the solvent. The attached polymer layer prevents formation of pigment agglomerates even at a very high solids level.

The coating mix of the present invention allows rapid structure formation in the wet film and prevents penetration of pigment and binder fines into raw stock pores. Thickness variance of the metered coating film is reduced accompanied by reduced micro gloss variation and improved calenderability.

Conventional coating formulations show much more penetration of fines into the raw stock pores, which over time leads to a coarsening of the pigment particle size distribution in the application system and gradually deteriorating gloss and smoothness parameters of the coated product. Because of increased coating thickness variance, micro gloss variations of the coated surface become very objectionable.

The present inventions relates to an aqueous formulation with a solids level range from 50 to 80% by weight, comprising pigments and binders, whose viscosity at 10 $sec^{-1}$ is higher than $10^{-3}$ mPa.s, preferably above $10^4$ mPa.s and especially preferred $10^5$ to $10^8$ mPa.sec. At a shear rate of $10^5$ $sec^{-1}$ viscosity of the coating composition of this invention drops to values ranging from 30 to 100 mPa.sec.

Viscosities were measured with a Stress Tec Viscometer manufactured by Reo Logica, Lund, Sweden, a Brookfield viscometer, manufactured by Brookfield Engeneering Laboratories, 240 Cushing St. Stroughton, Mass. 02072 USA and a HACAV II capillary viscometer.

The viscosity values determined according to the method of Brookfield are dependent upon spindle type and rotation velocity. The viscosity values indicated in this patent application have been determined by using spindle No. 4 and rotation velocities of 10/min or 100/min, respectively. The viscosity values were determined at temperatures of 20° C.

Preferred are coating formulations containing kaolin and especially preferred are formulations containing UFGL. Especially preferred is UFGL with a particle size distribution of 90–99% by weight below 2 $\mu$m diameter. Such pigments are used for production of high gloss printing paper grades.

The invention relates to pigment particles, which are encapsulated by a polymer shell, which prevents formation of pigment agglomerates. A preferred embodiment of the present invention contains pigment particles with a polymer shell consisting of graft polymers derived from proteins grafted with ethylenically unsaturated monomers with functional amide or amino groups.

Such polymers are strong polymeric Lewis bases (electron donors) and show a high adsorption affinity to the pigment surface. The adsorbed polymer layer stabilizes the pigment particles especially the ultra fine pigment fraction.

Examples of polymers, which can be used within the scope of this invention, are proteins like soy proteins, casein and as the preferred embodiment gelatine, which is polymer grafted with acrylamides, methacrylamides, aminoalkylacrylates, aminoalkylmethacrylates or blends of these monomers.

The polymers applied according to this invention can contain primary, secondary or tertiary amino groups. Other examples of polymers, which can be used according to this invention are proteins like soy proteins and preferably gelatin, which is grafted with lactames comprising ethylenically unsaturated groups, such as N-vinyllactames, like N-vinylcaprolactam or N-vinylpyrrolidon or with a blend of said monomers.

Especially, preferred components for the preparation of coating formulations, according to this invention are gelatines grafted with amide or amino group containing ethylenically unsaturated monomers. The weight ratio between ethylenically unsaturated monomers and gelatine can reach to a 1:1 ratio, preferably between 0.1:1 and 1:1.

These are novel compounds and are also an objective of the present invention.

Apart from A-type (acid hydrolized) gelatins, B-type gelatines (alkali hydrolized) are preferably used as backbone for the grafting process. Gelatines with Bloom values of 80 to 240 preferably between 100–160 are used.

Examples for amide group containing ethylenically unsaturated nonomers are amides of acrylic acid or of methacrylic acid, N-vinyllactemes, like N-vinylpyrrolidon and N-vinylcaprolactam.

The grafting process can be carried out in the aqueous phase by using state of the art initiators like the redox system, peroxydisulfate/sodiumdithionite. The grafting process has to be controlled carefully to avoid undesirable crosslinking reactions, which will reduce solubility of the graft polymers and can interfere with their capability to act as steric stabilizers. Excellent results are obtained, if the grafting reaction is carried out in the presence of urea or similar acting compounds like guanidine salts, dicyandiamide or melamine. These compounds improve both, solubility of the gelatine and contribute to obtain a grafted product with good solubility. The solubilizing agent like urea is preferably added to the gelatine in a 1:1 weight ratio or with a slight surplus.

Preferred are coating formulations, which contain between 0.1 to 1 pts by weight of dry graft polymer on 100 pts by weight of dry pigment, especially between 0.2 to 0.5 pph. Preferred are gelatines grafted with N-vinyllactames, like N-vinylpyrrolidone but preferably N-vinylcaprolactam.

Examples of binder and other additives are styrene-butadiene or styrene-acrylate dispersions, optical brightening agents like 4,4-diaminostilbenedisulfonic acid, preservatives, dispersants like sodiumpolyacrylate, lubricants like sodium-, ammonium- or calciumstearate, defoamers and dearators, caustic soda or ammonia for pH-adjustment and crosslinkers like urea, or melamine-formaldehydecondensates, gyloxale, glyaxale resins and dispersed or water soluble oxirane resins. The coating mix of the present invention contains water as a preferred vehicle.

Another preferred embodiment of the present invention contains between 0. 1 to 1 pph, preferably between 0.2 to 0.05 pph of an amino group containing polymer, especially polymers derived from esters of ethylenically unsaturated carboxylic acids like acrylic or methacrylic acid with amino alkylalcohols, especially the N,N dialkylsubstituted derivates.

Such polymers can be obtained by radical polymerization of monomers like dimethylaminoothylmethacrylate or -acrylate in the presence of azoinitiators. pH of the reaction mixture can be adjusted with carboylic acids, like acetic acid. Preferably the polymerization is carried out in the presence of dissolved polyvinylalcohol.

The reaction product of the polymerization forms hydrogen bonds with polyvinylalcohol. The polymer complex with polyvinylalcohol acts as a protective colloid for pigment particles.

The reaction is preferably earned out in 100 parts polyvinylalcohol with 10 to 25 parts of N,N-dimethylaminoethylmethacrylate or -acrylate in the presence of 0.05 to 0.5 parts of an azoinitiator.

Viscosity of the coating colours of the present invention as measured with a Brookfield viscometer at 100/min are below 1100 mPa.sec preferably below 900 mPa.sec at 10/min viscosities range from 2000 to 7000 mPa.s.

The coating mixes of the present invention produce particularly good results if used in conjunction with very fine coating pigments, which with conventional state of the art systems tend to form streaks at the bade, excessive micro gloss variations and uneven ink acceptance of the coated sheet.

Especially UFGL pigments, which if agglomerates are generated in the coating produce low gloss can advantageously be used as the sole or major pigment component to produce coated grades with high brightness and gloss.

Without being bound by theory it appears, that the surprising effect of the coating mix of the present invention originates from a three dimensional structure between pigment and binder dispersion particles caused by adsorptive polymer bridges, which prevents separation effects between coarser and finer particles as experienced with state of the art formulations.

The three dimensional structure is disrupted by the application of shear stress but rebuilds after shear stress has subsided. State of the art systems depend on thickening of the aqueous phase with soluble polymers only and do not show this effect.

As very low shear rates but high hydrodynamic pressures are existing in the nip of a roll applicator, the three dimensional structure prevents excessive penetration of coating mass into raw stock pores. Thixotropic formulations described previously, do not exhibit, the unique time dependent viscosity variations of the coating formulation of the present invention.

In the FIGURE the viscosity curve of the coating formulation with grafted gelatine (curve 1, example 3) is demonstrated in comparison with a state of the art coating colour, thickened with carboxymethylcellulose (curve 2, example 1).

In this example, a significant higher viscosity at low shear rates is obtained for the new coating formulation. At high shear rates of $10^6$ sec$^{-1}$, which simulate blade action to an extent, much lower viscosities are obtained with the novel coating formulation.

The dense packing of the sediment layer, which forms at the raw stock/coating wet film interface with the coating mix of the invention reduces water release from the applied coating layer into the raw stock and provides both good coverage and excellent runnability at the blade.

To determine the water retention of a coating formulation coating is applied onto a filter paper placed between two electrones. With an applied voltage of 4.5 V, the time is recorded until a current of 1 mA is reached.

A more advanced method to determine water release and penetration characteristics of a given raw stock coating mix combination is the Modul C Penetration Dynamic Analyzer, supplied by Mütek Analytic GmbH in Herrsching. The method is described in detail in "Wochenblatt für Papierfabrikation" 16, 1999, p. 1023–1027. The formulations of the present invention show a pronounced transmission maximum of a 2 MHz ultrasonic beam between 200 and 2000 msec.

The coating formulations of the present invention improve both substrate coverage and reduce water release into the raw stock. Blade pressure is reduced and runnability at the blade is improved. The improved substrate coverage obtained with the novel coating formulations lead to more homogeneous ink acceptance of the topcoated paper and a reduction of print mottle.

State of the art coating formulations depend in terms of gloss development of the coated sheet very much on the application solids level. Another advantage of the novel coating formulation is independence of gloss development from application solids.

Production related gloss variations originating from variations in solids level of the coating mix can thus be avoided. For top coating formulations, solids levels of up to 73% can be run without disturbing rheological streaks or bleeding at the blade. Calender pressures can be reduced. The optimal pigment packing results in high gloss levels and higher brightness of the coated sheet, higher printed gloss and uniform ink acceptance.

EXAMPLES

The advantages of the present invention are demonstrated in the following examples. The relevant process parameters are listed in the endowed tables. Viscosity is expressed as Brookfield viscosity at 10/min or 100/min. Gloss figures are measured according Lehmann at an incident angle of 75°.

The occurrence of backtrap mottle is rated visually. Coat weight is expressed in g/m². All measurement figures within a trial sequence are comparable. The quantities quoted in the tables are expressed in pph on pigment, dry solids is expressed in weight percent. Brightness figures were determined with an instrument from Minolta with Beriumsulfte as a reference.

A number of abbreviations is used.

|  |  |
|---|---|
| SB Latex | styrene-butadien latex |
| CMC | carboxymethylcellulose |
| PVOH | polyvinylalcohol |
| WRV | water retention |
| PVP | polyvinylpyrrolidone |

Example 1 and 3 compare two top coating formulations including with example 1 a state of the art formulation of gelatine according to DEC-19529661 and example 3 a coating formulation representing the present invention with an N-Vinylcaprolactame grafted gelatine.

Manufactured of the Grafted Gelatine 70 pts of an acid hydrolized gelatine with a Bloom value of 240, 30 pts of N-vinylcaprolactame and 100 pts of urea were added under strong agitation to 280 pts of water. The mixture was heated to about 50° C. until all of the gelatine particles had dissolved. 0.2 pts of sodiumdithionite dissolved in 10 pts of water were added. The mixture was heated to 75° C., 0.2 pts. of ammoniumperoxidsulfate dissolved in 10 pts. of water were added dropwise during a 60 min time period.

The reaction mixture was maintained at this temperature for another 180 min. The reaction mixture was then cooled under constant stirring to room temperature. As reaction product a hazy, yellowish solution was obtained.

|  | State of the art | | Invention |
|---|---|---|---|
|  | Example 1 | Example 2 | Example 3 |
| UFGL | 100 | 100 | 100 |
| SB latex | 12 | 12 | 12 |
| CMC FF 5 | 0.4 | — | — |
| PVOH 5-88 | 0.6 | 0.6 | 0.6 |
| Gelatin 240 A | — | 0.4 | |
| Grafted gelatin | | | 0.4 |
| Solids level | 66 | 66 | 66 |
| PH | 8.5 | 8.5 | 8.5 |
| Viscosity 100/min 20° #4 | 1600 | 1400 | 850 |
| WRV sec | 8 | 9 | 14 |
| Gloss 75°0 C. | 45 | 50 | 65 |
| Brightness % TAPPI R 457 | 81 | 81 | 83 |
| Coat weight g/m² | 8.5 | 8.5 | 8.5 |
| Back trap mottle | Strong | Medium | none |

Coating formulations were coated with a Dow Lab Coater on a 75 g/m² precoated free sheet grade, gloss level was determined after lab calendering at 65 kN/m, nip steel roll temperature 90° C. 2 nips.

The coating formulation of the present invention produced higher gloss, combined with higher brightness and much higher water retention.

Example 4 and 5 demonstrate the improvements in runnability and quality obtainable with the novel formulation in comparison on the basis of PVP as described in patent DE-C 19529661 (example 3, trial 8 and 9).

|  | State of the art formulation example 4 | Invention Example 5 |
|---|---|---|
| UFGL | 100 | 100 |
| Styrene-acrylate dispersion | 13 | 13 |
| PVP K 30 | 0.3 | |
| Grafted gelatin | | 0.3 |
| PVOH 5-88 | 0.7 | 0.7 |
| Solids level % | 67 | 67 |
| PH | 8.5 | 8.5 |
| Viscosity 100/min 20° C. | 1400 | 1050 |
| WRV sec | 8 | 14 |
| Gloss 45° C. | 40 | 65 |
| Brightness TAPPI R 457 | 80 | 82 |
| Coat weight g/m² | 8 | 8 |

The coating formulations were applied to a precoated 185 g/m² recycled fiber containing packaging board, with a wire wound rod. The novel coating formulation produces much higher gloss and higher brightness.

Example 6 and 7 compare runnability properties and quality parameters of a coating formulation containing an amino group containing polymer (example 7) with a state of the art formulation comprising CMC.

Manufacture of "Additive 7"

200 pts of a partially hydrolized polyvinylalcohol with a viscosity of 5.5 mPa.s and degree of hydrolysis of 88% were dissolved at 95° C. in 800 pts of water.

A mixture of 30 pts Dimethylaminoethylmethacrylate, 15 pts acetic acid with 60% active content, 0.2 pts 2,2-Azo-bis-aminopropane)-dihydrochloride in 70 pts of water were added dropwise over a time period of 90 min at 75° C. reaction temperature.

The reaction mixture was stirred for another 180 min at 75° C. and then cooled. The reaction product was a transparent too slightly hazy, viscous, colourless liquid.

|  | State of the art formulation example 6 | Invention Example 7 |
| --- | --- | --- |
| GL[1] | 100 | 100 |
| Enzyme converted starch | 4 | 4 |
| SB latex | 8 | 8 |
| CMC | 0.3 | |
| "Additive 7" | 0.7 | 0.3 |
| Solids level % | 68 | 68 |
| PH | 8.5 | 8.5 |
| Viscosity 100/min 20° C. | 1200 | 900 |
| WRV sec | 15 | 25 |
| Coat weight g/m$^2$ | 12 | 12 |
| Blade pressure [mm] | 6 | 2.5 |
| Smoothness PPs μm | 4.5 | 3.0 |

The coating was applied to a 67 g/m$^2$ precoated free sheet raw stock without internal sizing but a surface size treatment with starch. The novel coating formulation showed lower viscosity, higher water retention and required lower blade pressure.

Roughness of the precoated sheet was reduced considerably with the novel coating formulation.

What is claimed is:

1. A coating composition for the production of printable paper and board comprising an aqueous dispersion of pigments and additives possessing a solids content of 50 to 80% by weight which composition contains a graft polymer derived from a protein grafted with (a) at least one ethylenically unsaturated monomer comprising at least one amine group or (b) with at least one ethylenically unsaturated monomer comprising at least one amide group and at least one amine group and/or (c) with at least one lactam comprising ethylenically unsaturated groups.

2. The coating composition according to claim 1, wherein the graft polymer is derived from soy protein, caseine or gelatin, which are grafted with aminoalkylacrylate, aminoalkylmethacrylate or with blends of said monomers.

3. A coating composition for the production of printable paper and board comprising an aqueous dispersion of pigments and additives possessing a solids content of 50 to 80% by weight which composition contains a graft polymer derived from soy protein or gelatin, which are grafted with lactams comprising ethylenically unsaturated groups.

4. The coating composition according to claim 3, wherein the lactam is selected from the group consisting of N-vinyllactam, N-vinylpyrrolidone and N-vinylcaprolactam.

5. The coating composition according to claim 4, wherein the pigment comprises limestone.

6. The coating composition according to claim 5, wherein 90 to 99% by weight of the limestone are particles with a diameter of below 2 μm.

7. The coating composition according to claim 1, wherein the lactam is used and is selected from the group consisting of N-vinyllactam, N-vinylpyrrolidone and N-vinylcaprolactam.

8. The coating composition according to claim 7, wherein the pigment comprises limestone.

9. The coating composition according to claim 8, wherein 90 to 99% by weight of the limestone are particles with a diameter of below 2 μm.

* * * * *